Nov. 14, 1950        F. C. RAMSING        2,530,078

METALLURGICAL FURNACE

Filed Feb. 11, 1948

Inventor
Frederick C. Ramsing

By Bacon & Thomas
Attorneys

Patented Nov. 14, 1950

2,530,078

UNITED STATES PATENT OFFICE 2,530,078

METALLURGICAL FURNACE

Frederick C. Ramsing, Phoenix, Ariz.

Application February 11, 1948, Serial No. 7,625

3 Claims. (Cl. 266—33)

This invention relates to a metallurgical furnace, and more particularly, to a furnace for continuously melting fusible materials in which particles of the materials being fused are carried in a vortex of burning gases and heated products of combustion and in which the fused materials are collected as a layer upon heated furnace walls and drain into a pool of molten material.

The furnace has particular utility for the smelting of various ores to produce either molten metal or matte as well as slag. In many instances, the proportions of the slag forming materials employed in a smelting operation can be adjusted so that the resulting molten slag is immediately available for the production of rock wool. The furnace also has utility for the fusion of properly proportioned slag or slag forming materials for the production of rock wool even though no ore is fed to the furnace.

In general, the furnace of the present invention includes a furnace chamber which is circular in cross-section and positioned so as to have a vertical axis. The furnace chamber has its largest diameter adjacent the lower portion of the furnace and tapers inwardly near its upper portion, providing a flue or discharge passage at the top for exhaust gases. Fuel is injected tangentially into the furnace chamber near the lower portion thereof along with a blast of air or oxygen to support combustion and the resulting flame and products of combustion spiral upwardly adjacent the furnace walls. The blast referred to as well as the expansion of gases due to burning of the fuel produces a high velocity vortex in which the flame and heated products of combustion make a plurality of passes around the inner periphery of the furnace walls before being exhausted from the furnace. The inner walls of the furnace forming the furnace chamber are constructed of refractory material and become highly heated.

Finely divided material to be fused or smelted is also injected tangentially of the furnace wall, preferably adjacent the point of injection of the fuel, the finely divided material being carried by a stream of gas or air. The particles come into immediate contact with the flame and likewise spiral upwardly in the vortex adjacent the heated walls of the furnace chamber. Particles of the material become fused in the vortex and are thrown against the heated walls of the furnace by centrifugal force. They collect in a layer of fused material which runs downwardly along the furnace walls and is collected in the lower portion of the furnace.

In the case of a smelting operation, a proper mixture of ore particles and slag forming material is injected into the furnace so that the fused material which collects in the lower portion of the furnace separates into an upper layer of slag and a lower layer of molten metal or matte. The inwardly tapering walls of the furnace become highly heated and radiate heat downwardly against the walls of the furnace and the molten material in the lower portion thereof. Separate conduits for slag and molten metal or matte are preferably provided although the entire molten material may, if desired, be withdrawn as an admixture before complete separation takes place and later settled to separate slag from the molten metal or matte.

The fused material which collects upon the walls of the furnace acts as a heat insulator to partially protect the refractory material from the highly heated flame and products of combustion and also from abrasion by solid particles. Solid particles which do not reach their fusion temperature in the heated vortex are thrown into the already fused material on the furnace walls and melt therein by reason of the heat radiated thereto from the flame and products of combustion and from the opposed furnace walls. The radiant heat from the furnace walls, particularly the upper inwardly tapering portion thereof, maintains the slag which collects in the lower portion of the furnace in a highly heated liquid condition and this slag may flow continuously from the furnace or be tapped therefrom at intervals. When the furnace is used for smelting, molten metal or matte collects below the slag and may likewise flow continuously from the furnace or be tapped therefrom intermittently. The entire process is rapid and continuous since the small size of the particles supplied to the furnace enables them to be rapidly heated throughout. The process is subject to more accurate control than prior processes and may be carried on at less expense both as to first cost and as to operating costs.

It is therefore an object of the present invention to provide an improved metallurgical furnace for continuously fusing finely divided material.

Another object of the invention is to provide an improved metallurgical furnace in which a spiral path of flame and heated products of combustion is produced and finely divided material to be fused is injected into the spiral to be carried therewith.

Another object of the invention is to provide a metallurgical furnace in which finely divided ore is carried in suspension in a vortex formed of flame and heated products of combustion and fused material is deposited upon the walls of the furnace so as to run downwardly therealong and be collected in the lower portion of the furnace.

A further object of the invention is to provide a furnace for fusing ore or other material in which small particles of ore and slag forming materials are carried in an upwardly spiralling vortex of flame and heated products of combustion wherein they are fused and thrown from the vortex in fused condition.

A still further object of the invention is to provide an improved metallurgical furnace in which a finely divided material to be fused is injected into an upwardly ascending vortex of flame and heated production of combustion and the resulting fused particles separate out and collect below such vortex.

Other objects and advantages of the invention will appear in the following description of preferred embodiments thereof, suitable apparatus for carrying out the invention being shown in the attached drawing, of which:

Figure 1:
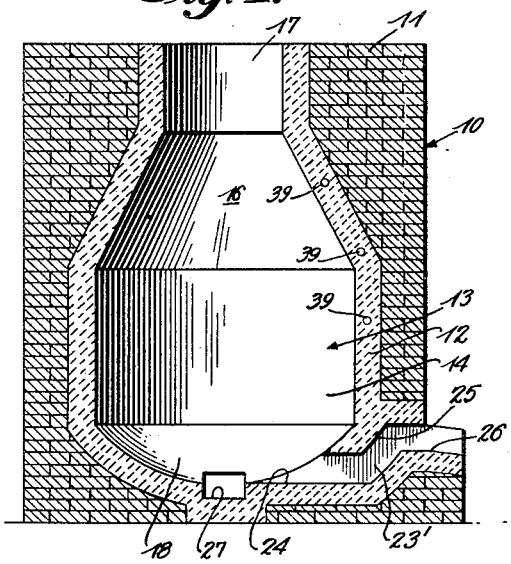
Fig. 1 is a vertical section of a metallurgical furnace taken on the line 1—1 of Fig. 3.

Referring more particularly to the drawings, the furnace 10 of the present invention may be circular in horizontal cross-section and may have the outer portion 11 of its walls constructed of any suitable heat insulating structural material, for example, the brick work indicated. The heat insulating material 11 may be lined with any suitable refractory material 12 to provide a furnace chamber 13. The furnace chamber will ordinarily be circular in horizontal cross-section and have a portion 14 of greatest diameter adjacent its lowest portion. The portion 14 may be cylindrical and may be positioned directly below an inwardly tapering portion 16. The portion 16 may be formed by upwardly converging walls of refractory material 12. As illustrated, the portion 16 is frusto-conical so as to have straight elements in vertical section but such elements may have any desired curvature. The converging portion 16 of the furnace chamber may terminate at its upper end in a flue portion 17 which may be connected to any suitable flue structure not shown. The lower portion of the chamber provides a collecting chamber 18 which is shown as being substantially in the form of a portion of a sphere but may be frusto-conical or have any other desired shape so that the molten material will drain toward the discharge conduits.

A combustible mixture, along with finely divided material to be fused, may be introduced tangentially into the lower end of the furnace portion 14 through a tangential opening 19 also lined with the refractory material 12. The combustible mixture may be tangentially directed through the opening 19 by means of a pipe 21 having a nozzle 21′ and the flame produced by ignition of the combustible mixture and the heated products of combustion spiral upwardly adjacent the walls of the furnace chamber through the portions 14 and 16, thus heating the refractory walls of the furnace. Finely divided material carried in suspension in air or other suitable gas may likewise be tangentially injected into the furnace through the opening 19 by means of a pipe 22, provided with a nozzle 22′, the preferred position for introducing the finely divided material being between the flame and the wall of the furnace. The finely divided material thus enters the flame and is carried upwardly in the spiral. The remainder of the opening 19 around the nozzles 21′ and 22′ may be filled with a clay plug indicated at 23, the discharge ends of the nozzles preferably being positioned a substantial distance back in the opening 19 from the furnace chamber 13 so as to be partly protected from the heat in the furnace chamber.

Figure 2:
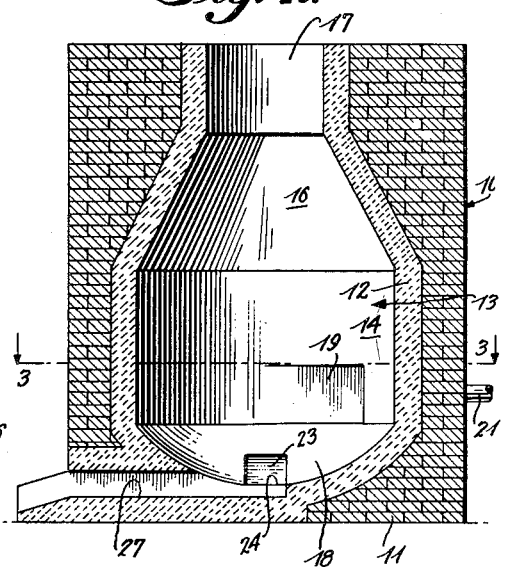
Fig. 2 is a view similar to Fig. 1 taken on the line 2—2 of Fig. 3.
Figure 3:
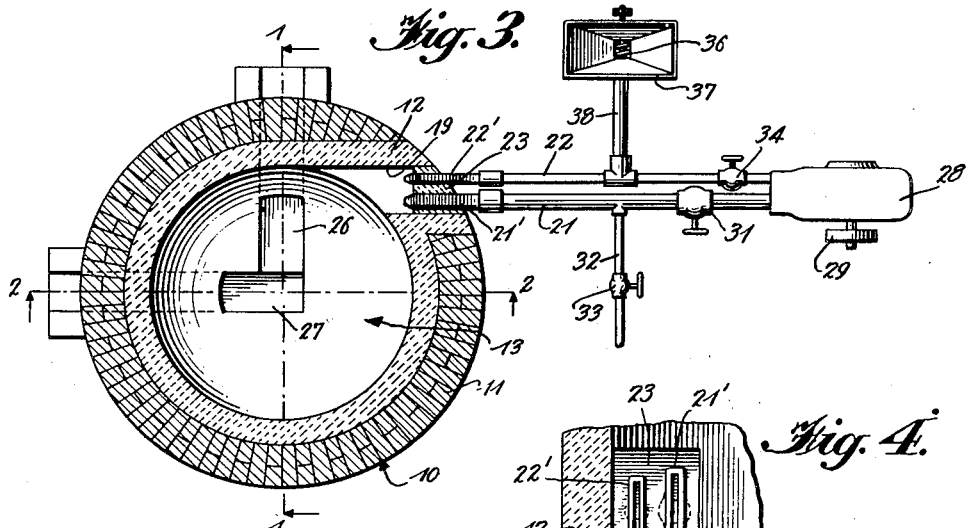
Fig. 3 is a horizontal section taken on line 3—3 of Fig. 2.

At least a portion of this finely divided material is fused in the heated vortex before being deposited upon the walls of the furnace by centrifugal force to produce a layer of fused material upon the furnace walls of the portion 14 and extending upwardly into the tapering portion 16. Some of the solid particles may enter this fused layer before being melted so as to merge with and fuse therein. The fused material runs down the walls of the furnace into the lower portion 18 of the furnace chamber. When the furnace is used for a smelting operation, separation takes place into an upper layer of slag and a lower layer of molten metal or matte in the lower portion of the furnace chamber. The heat from the spiral flame as well as the heat radiated from the walls of the furnace, particularly the walls of converging portion 16, maintain the slag in highly fluid condition and this slag may be discharged from the furnace through a slag discharging conduit 23′ either continuously or intermittently. It will be understood that for intermittent operation, the conduit 23′ may be plugged with the usual clay plug between tappings. The conduit 23′ preferably has its opening 24 into the furnace chamber positioned below the normal upper surface of the slag and preferably extends upwardly as indicated at 25 to a discharge opening 26 so that a pool of slag is always retained in the furnace. As shown most clearly in Fig. 2, molten metal or matte may be discharged through a conduit 27 positioned below the slag discharge conduit 23′, the usual operation being to intermittently discharge molten metal or matte by employing the usual clay plug for the conduit 27.

The blast for delivering both the fuel mixture and the suspension of finely divided material into the furnace may be produced by a blower indicated at 28 which blower may be driven from any suitable source of power, for example, through a pulley 29. In the embodiment shown, air may be employed both for introducing the material to be fused and for admixture with the fuel. Thus, the pipe 21 leading from the blower 28 may have a valve 31 therein for regulating the amount of air for admixture with the fuel and fuel may be introduced into the pipe 21 through a pipe 32 also provided with a regulating valve 33. The preferred fuel is an inflammable gas, such as natural gas or manufactured gas, but it will be apparent that other fuel, such as liquid or finely divided powdered fuel, may be employed. The pipe 22 for introducing the finely divided material may likewise be connected to the blower 28 and be provided with a regulating valve 34. Finely divided material to be fused may be introduced into the pipe 22 in any suitable manner, for example, by means of a screw conveyor 36 leading from the lower portion of a hopper 37 and having a casing 38 communicating with the pipe 22. Such a screw conveyor may be employed to deliver regulated amounts of finely divided material into the pipe 22 and thus produce a suspension of finely divided material in an air blast, although any other type of proportioning device suitable for handling powdered material may be employed.

Figure 4:
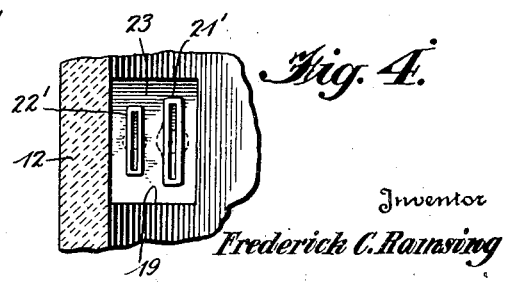
Fig. 4 is a fragmentary view showing the ends of the nozzles for injecting fuel and material to be fused.

As shown in Fig. 4, the nozzles 21' and 22' for pipes 21 and 22, respectively, preferably terminate in flattened portions in which the openings have a substantially greater vertical dimension than horizontal dimension. The nozzle 21' provides a flattened or ribbon-like flame which is parallel to the furnace walls and spirals upwardly in the furnace chamber making a plurality of passes around the furnace chamber to substantially uniformly heat the walls of the furnace chamber. Likewise, the nozzle 22' provides a flattened stream of particles suspended in a suitable gas between the flame and the walls of the furnace. Both of these streams, however, diverge from the nozzles and merge within the furnace chamber so that the particles are subjected to direct contact with heated products of combustion and heat radiated from the walls of the heated chamber. If air is employed to carry the particles, the stream of suspended particles also provides secondary air for the flame, but it is apparent that an inert or reducing gas can be employed to carry the particles if a reducing atmosphere is required in the particular fusion or smelting process being carried out. The temperature of the refractory lining of the furnace chamber may be determined by any suitable temperature responsive elements, for example, a plurality of thermocouples embedded in the refractory walls as indicated at 39. The temperature of the furnace walls is closely correlated with the actual temperature within the furnace in any given process and may be employed to control the nature and amount of the combustible mixture as well as the feed of finely divided fusible material to thereby control the temperature in the furnace chamber.

As stated above, the particles of ore or slag forming materials, or both fuse in the flame due to heat imparted thereto by direct contact with heated gases as well as by radiation from the furnace walls. The fused particles collect on the peripheral walls of the furnace to form a viscous molten mass which adheres to the walls of the furnace and partially protects them from the heat developed in the furnace. The inner surfaces of this material, which are directly exposed to the heat of the flame and to radiated heat from the other walls of the furnace, reach a sufficiently high temperature to be fluid and the molten material runs down the furnace walls into the pool of molten material in the lower portion of the furnace. Some of the solid particles before fushion enter this molten layer on the furnace walls and are rapidly fused therein. Radiation of heat from the flame and the solid walls of the furnace, particularly the upper inclined walls of the furnace, maintains the pool of material in the lower portion of the furnace in fluid condition so that rapid settling of molten metal or matte from the slag occurs during a smelting operation. The slag and molten metal or matte may be intermittently or continuously discharged through the respective discharge openings 26 and 27, respectively, suitable clay plugs being employed for intermittent operation.

The furnace of the present invention is adaptable to a large number of metallurgical uses involving fusion of ores or slag. Thus, various ores including copper, lead, zinc, nickel and iron may be smelted in the furnace and these ores may be substantialy any type such as silicate, sulfide, carbonate or oxide ores. Ordinarily, copper and nickel ores are smelted under conditions producing a matte, sufficient sulfur or sulfides being incorporated into the ores if the ores are deficient in sulfur to produce such a matte, and excess sulfur being burned in the furnace if the ores contain a greater amount of sulfur than that desired in the matte. In the case of lead ores, it is possible to produce both molten metal and matte, the molten metal collecting as a lower layer, the matte as an intermediate layer and the slag as an upper layer. Separation of molten lead from matte may be accomplished by correct tapping of the furnace or by providing an additional outlet for molten metal in addition to outlets for matte and slag, or the matte and molten metal may be tapped together and later separated. Ordinarily, molten iron will be produced when smelting iron ores, but in the case of zinc ores, the zinc will usually be volatilized and discharged with the exhaust gases. It will be understood that known or suitable condensing equipment will be required in case zinc ores are being smelted, and also that in any case, known or suitable heat recovery apparatus will be associated with the furnace to recover heat from the exhaust gases as is well known in metallurgical operations.

In order to prevent substantial amounts of ore particles either in solid or molten condition from being carried out with the exhaust gases, the flue portion 17 of the furnace chamber should be substantially smaller than the main portion 14 of the furnace. In most cases, the diameter of the flue portion should be approximately one-half of the greatest diameter of the furnace, i. e., the flue portion 17 should have an area approximately one-quarter of that of the portion 14 of the furnace chamber, although the exact ratio of the diameter of the flue portion and the diameter of the main furnace chamber will vary somewhat depending upon the particular smelting or other operation being carried out in the furnace. This ratio of the diameter of the flue portion to the diameter of the main chamber of the furnace may thus vary from approximately one-third to two-thirds. The gases in the vortex in passing from the main portion of the furnace chamber 14 into the flue portion 17 have their peripheral velocity increased while at the same time the radius of the vortex is decreased so that the centrifugal force on any particles carried into the upper portion of the vortex is increased to throw such particles out of the vortex.

The finely divided fusible material introduced through the nozzle 22' in a smelting operation will ordinarily consist of a mixture of ore particles and slag forming particles. That is to say, the gangue associated with the metal values of an ore very seldom contain the necessary balance of ingredients to produce a slag of the correct composition and fluidity. Various additions such as silica or silicates, iron oxide, lime, sulphides, etc., are, therefore, desirably admixed with the ore in order to produce a suitable slag. The correct ratios of the various ingredients for a particular smelting operation are known to the art and need not be further discussed. In general, such additions are made by grinding or otherwise pulverizing the material to be added and thoroughly admixing it with the finely divided ore prior to injecting the finely divided material into the furnace in suspension in a stream of gas. The particle size of the ore and added material may vary over a considerable range depending upon the particular operation being carried out, for example, particle sizes between approximately 200 mesh to particles averaging 1/8" in diameter. The particle sizes employed will depend not only upon the nature of the material fused but also upon the size of the furnace, the smaller sized particles in the range above mentioned being preferred in most cases since the smaller the particle size, the more rapid the fusion of the particles. Feeds of particles as small as 10 microns can be satisfactorily separated by centrifugal force from the gases leaving the furnace, but in general, the cost of producing such small sized particles overbalances any advantages obtained unless the ore is already in such a fine stage of division.

In most ore smelting operations, the silica ratio of the materials being fused can be adjusted so that a molten slag suitable for the production of rock wool directly from such molten slag can be obtained. The correct balance of ingredients in a slag for the production of rock wool is known to the art and also need not be further discussed. As stated above, the furnace also has utility for the production of a molten slag suitable for making rock wool even though no metallic values are present or recovered from the furnace. Thus, previously formed slag from other metallurgical operations may be remelted in the furnace of the present invention, or a mixture of slag forming materials suitable for producing a rock wool slag may be supplied to the furnace. If required, other slag forming materials can be introduced along with a slag from another metallurgical operation in order to produce a suitable rock wool slag. In any case, the slag or slag forming materials are introduced in finely divided form in suspension in a stream of gas and a highly fluid slag suitable for the direct production of rock wool may be continuously or intermittently discharged from the furnace.

For certain smelting operations, a reducing atmosphere is required and for others an oxidizing atmosphere. It will be apparent that the ratio of fuel to air can be varied to provide a suitable atmosphere for any desired smelting operation and that the particles of ore or slag forming materials may be introduced either in an oxidizing gas, an inert gas or a reducing gas, depending upon the nature of the atmosphere required in the furnace. The gases entering the furnace, both in admixture with fuel and in admixture with the particles to be fused need not be under excessive pressure. In general, the pressure required to form the blasts is approximately 8 inches of water, i. e., from approximately 6 to 10 inches of water. Burning of the fuel causes substantial expansion of the gases so that high velocity is obtained in the vortex. Ordinarily heat is extracted rapidly from the flame and products of combustion by the particles being fused so that the expansion of the gases due to the heat thereof is approximately four times the volume of the entering gases, and ordinarily the gases will be discharged through the flue portion 17 of the furnace at approximately one-half the pressure of the entering gases.

In starting up the furnace, the mixture of fuel and air is first introduced until the interior furnace walls reach the desired temperature. This temperature will, of course, vary with the nature of the material being fused and will ordinarily be slightly above the fusion point of the materials being treated. That is to say, the "heat lead" of the furnace is small since the small size of the particles and the efficient contact thereof with heated gases, as well as the efficient radiation of heat from the furnace walls, causes the particles to be rapidly heated even though the average temperature in the furnace is only slightly above the fusion point of the particles. This, in conjunction with the protective layer of fused material on the furnace walls, reduces the destructive action of heat on the refractory lining of the furnace. The thermocouples or other temperature responsive elements in the refractory walls may be employed to determine when the furnace is up to heat. When the desired temperature has been obtained, injection of finely divided material to be fused is started. While the preferred manner of feeding the fusible particles is to employ a separate nozzle and a separate stream of suspending gas for the fusible material, it is possible to suspend the fusible particles in the combustible mixture. Thus the particles to be fused may be delivered into the stream of air or oxygen employed to support combustion before or after admixture with the fuel or may be delivered into a stream of gaseous fuel or admixed with powdered fuel before admixture with the air or oxygen so that the particles to be fused are fed directly into the flame with the combustible mixture.

The absorption of heat by the material being fused per unit of time per unit of feed is a major factor enabling the "heat lead" of the furnace of the present invention to be held at a minimum value. That is to say, the small size of the particles being fused and the fact that they are fed directly into the flame enables the heat of the flame to be maintained at a temperature just above the fusion temperature of the particles. By way of illustration, a particle having a diameter of .01 inch will be heated to fusion temperature when exposed to a given flame temperature in approximately 1/10,000 of the time required to heat to fusion temperature a similarly shaped particle having a one inch diameter. The small particles absorb heat from the flame with sufficient rapidity to fuse almost instantaneously and as the small particles are distributed throughout the flame, the feed of such particles can be balanced against the flame heat to neutralize excess flame temperature almost instantaneously. For example, the fuel-air combustion temperature of a particular fuel mixture may be 3000° F. while the fusion temperature of the material being treated may be 2000° F, giving an "over temperature" or "heat lead" of 1000° F. By employing the small particle feed of the present invention and introducing the feed directly into the flame, the actual temperature of the flame may be reduced, for example, to 2200° F., producing a "heat lead" of 200° F. only. The lower flame temperature not only reduces heat losses but also materially lessens deterioration of the refractory furnace walls.

From the above description, it will be apparent that I have provided an apparatus by which a wide variety of ores may be rapidly and continuously smelted, or by which a suitable molten slag for direct rock wool production is rapidly produced.

While I have disclosed the preferred embodiment of my invention, it is to be understood that the details thereof may be varied within the scope of the following claims:

1. Apparatus for fusing finely divided fusible material, which comprises, a furnace structure having an interior wall of refractory material providing a furnace chamber substantially circular in cross-section and having a vertical axis, said chamber having a lower collecting portion for fused material, a main substantially cylindrical portion immediately above said collecting portion and an inwardly converging portion immediately above said main portion merging at its upper end into a flue portion of substantially smaller diameter than said main portion, a nozzle structure adjacent the lower part of said main cylindrical portion arranged to direct a stream of combustible mixture substantially horizontally into the lower part of said cylindrical main portion and tangentially along the wall thereof, said substantially cylindrical portion extending upwardly a substantial distance above said nozzle structure whereby ignition of said combustible mixture produces a rotating vortex of flame moving upwardly adjacent the wall of said main portion, said nozzle structure having means for directing a stream of particles of said fusible material substantially horizontally into the lower part of said cylindrical main portion and tangentially along the wall thereof in the same circumferential direction as said combustible mixture, whereby said particles are carried upwardly in said vortex along the wall of said main portion, said particles are fused and a layer of fused material collects upon the wall of said chamber and runs down into said collecting portion, said converging portion of said chamber causing an increase in the circumferential velocity of the materials in said vortex to separate residual fused material by centrifugal force from the products of combustion and reflecting heat downwardly toward the wall of said main portion and toward the fused material in the collecting portion and means for withdrawing fused material from said collecting portion.

2. Apparatus for fusing finely divided fusible material, which comprises, a furnace structure having an interior wall of refractory material providing a furnace chamber substantially circular in cross-section and having a vertical axis, said chamber having a lower collecting portion for fused material, a main substantially cylindrical portion immediately above said collecting portion and an inwardly converging portion immediately above said main portion merging at its upper end into a flue portion of substantially smaller diameter than said main portion, a nozzle structure adjacent the lower part of said main cylindrical portion having a discharge opening elongated in a direction parallel to the axis of said chamber arranged to direct a vertically flattened stream of combustible mixture substantially horizontally into the lower part of said cylindrical main portion and tangentially along the wall thereof, whereby ignition of said combustible mixture produces a rotating vortex of flame moving upwardly adjacent the wall of said main portion, said nozzle structure having means provided with a discharge opening elongated in a direction parallel to the axis of said chamber for directing a vertically flattened stream of particles of said fusible material substantially horizontally into the lower part of said cylindrical main portion and tangentially along the wall thereof in the same circumferential direction as said combustible mixture, whereby said particles are carried upwardly in said flame along the wall of said main portion, said particles are fused and a layer of fused material collects upon the wall of said chamber and runs down into said collecting portion, said converging portion of said chamber causing an increase in the circumferential velocity of the materials in said vortex to separate residual fused material by centrifugal force from the products of combustion and reflecting heat downwardly toward the wall of said main portion and toward the fused material in the collecting portion and means for withdrawing fused material from said collecting portion.

3. Apparatus for smelting finely divided ore, which comprises, a furnace structure providing a furnace chamber having a substantially vertical axis, said furnace chamber being substantially circular in cross-section and having its walls lined with refractory material, said chamber having a lower collecting portion for collecting and settling fused material, a main substantially cylindrical portion immediately above said collecting portion, an inwardly converging portion immediately above said main portion merging at its upper end into a flue portion of substantially smaller diameter than said main portion, said main portion being of greater axial length than said converging portion, and of greater axial length than said collecting portion, means for directing a stream of particles of said ore and slag forming material substantially horizontally and tangentially into the lower part of said main portion of said chamber along the wall thereof, means arranged to simultaneously direct a stream of combustible mixture substantially horizontally and tangentially in the same circumferential direction as the particles into the lower part of said main portion of said chamber radially inwardly of said stream of particles in an amount providing sufficient heat when ignited to fuse said particles, whereby an upwardly moving rotating vortex of flame and heated products of combustion carrying said particles is produced adjacent the wall of said main portion and a layer of fused material collects on the wall of said chamber and runs down into said collecting portion, the particles being fused in said vortex by contact with said flame and in the fused material on said wall, said converging portion having its wall positioned to reflect heat to the walls of said main portion and to the fused material in said collecting portion, and means for withdrawing fused material from said collecting portion.

FREDERICK C. RAMSING.

REFERENCES CITED

The following references are of record in the file of this patent:

UNITED STATES PATENTS

| Number | Name | Date |
|---|---|---|
| 817,414 | Brown | Apr. 10, 1906 |
| 914,622 | Wikstrom | Mar. 9, 1909 |
| 1,218,412 | Kissoch | Mar. 6, 1917 |
| 1,567,934 | Ferguson | Dec. 29, 1925 |
| 2,168,597 | Auriol et al. | Aug. 8, 1939 |
| 2,184,300 | Hodson et al. | Dec. 26, 1939 |